(12) United States Patent
Nasaka et al.

(10) Patent No.: US 6,346,289 B1
(45) Date of Patent: Feb. 12, 2002

(54) FAT SOLIDIFYING AGENT, FATS, AND FOODS

(75) Inventors: Hajime Nasaka; Yuuji Sakamoto, both of Yokkaichi (JP)

(73) Assignee: Taiyo Kagaku Co., Ltd., Yokkaichi (JP)

( * ) Notice: Subject to any disclaimer, the term of this patent is extended or adjusted under 35 U.S.C. 154(b) by 0 days.

(21) Appl. No.: 09/402,330

(22) PCT Filed: Aug. 3, 1998

(86) PCT No.: PCT/JP98/03463

§ 371 Date: Oct. 4, 1999

§ 102(e) Date: Oct. 4, 1999

(87) PCT Pub. No.: WO99/40167

PCT Pub. Date: Aug. 12, 1999

(30) Foreign Application Priority Data

| Feb. 4, 1998  | (JP) | 10-039631 |
| Feb. 13, 1998 | (JP) | 10-48908  |
| Feb. 13, 1998 | (JP) | 10-48909  |
| Feb. 26, 1998 | (JP) | 10-64167  |
| Feb. 26, 1998 | (JP) | 10-064168 |
| Feb. 26, 1998 | (JP) | 10-64169  |
| Mar. 5, 1998  | (JP) | 10-73245  |
| Mar. 5, 1998  | (JP) | 10-73246  |
| Mar. 5, 1998  | (JP) | 10-73247  |

(51) Int. Cl.$^7$ ............................................. A23D 9/007
(52) U.S. Cl. ........................ 426/610; 426/611; 426/601
(58) Field of Search ...................... 426/610, 611, 426/601

(56) References Cited

U.S. PATENT DOCUMENTS

| 3,230,090 | A | * | 1/1966  | Weiss   | 426/611 |
| 3,397,996 | A | * | 8/1968  | Darragh | 426/611 |
| 4,726,959 | A | * | 2/1988  | Momura  | 426/607 |
| 4,877,636 | A | * | 10/1989 | Koyano  | 426/610 |
| 4,883,684 | A | * | 11/1989 | Yang    | 426/607 |
| 5,188,858 | A | * | 2/1993  | Stipp   | 426/531 |
| 5,380,544 | A | * | 1/1995  | Klemann | 426/610 |
| 5,626,902 | A | * | 5/1997  | Kuramori | 426/610 |
| 5,908,697 | A | * | 1/1999  | Roux    | 428/402.2 |
| 5,928,704 | A | * | 7/1999  | Takeda  | 426/610 |

FOREIGN PATENT DOCUMENTS

| JP | 55-64755   | * | 5/1980  |
| JP | 355064755  | * | 5/1980  |
| JP | 356131344  | * | 10/1981 |
| JP | 356164743  | * | 12/1981 |
| JP | 55025430   |   | 4/1983  |
| JP | 58-198245  | * | 11/1983 |
| JP | 359048048  | * | 3/1984  |
| JP | 359143550  | * | 8/1984  |
| JP | 59156242   | * | 9/1984  |
| JP | 359177123  | * | 10/1984 |
| JP | 1203319    |   | 8/1989  |
| JP | 6041577    |   | 2/1994  |
| JP | 6264049    |   | 9/1994  |
| JP | 406276978  | * | 10/1994 |
| JP | 07011280   | * | 1/1995  |
| JP | 07026285   | * | 1/1995  |
| JP | 07034084   | * | 2/1995  |
| JP | 7126604    |   | 5/1995  |
| JP | 7166151    |   | 6/1995  |
| JP | 9-187222   | * | 4/1996  |
| JP | 9-187222   | * | 7/1997  |
| JP | 09187222   | * | 7/1997  |

OTHER PUBLICATIONS

Swern 1979 Bailey's Industrial Oil and Fat Products vol. 1, 4$^{th}$ Edition John Wiley & Sons New York 335, 357, 431.*
Swern 1979 Bailey's Industrial Oil and Fat Products vol. 1, 4$^{th}$ Edition John Wiley & Sons p 19 & 22.*

* cited by examiner

*Primary Examiner*—Carolyn Paden
(74) *Attorney, Agent, or Firm*—Birch, Stewart, Kolasch & Birch, LLP

(57) ABSTRACT

A setting agent of fats and oils which comprises an ester of a fatty acid having 20 or more carbon atoms, or comprises the ester and at least one compound selected from the group consisting of polyglycerol fatty acid esters and sucrose fatty acid esters; fats and oils prepared by adding the setting agent of fats and oils; and food comprising the fats and oils.

18 Claims, 1 Drawing Sheet

FAT SOLIDIFYING AGENT, FATS, AND FOODS

This application is the national phase under 35 U.S.C. §371 of PCT International Application No. PCT/JP98/03463 which has an International filing date of Aug. 3, 1998, which designated the United States of America.

TECHNICAL FIELD

The present invention relates to a setting agent of fats and oils, fats and oils prepared by adding the same, and food comprising the fats and oils. More specifically, it relates to fats and oils in which the hardness of the fats and oils is freely adjusted by adding the setting agent of fats and oils to a raw material, and food comprising the fats and oils.

BACKGROUND ART

Conventionally, in order to set fats and oils, there have been known a process comprising raising their melting points by hydrogenation or the like, a process comprising adding a hardened oil, and the like.

In the case of the conventional method for setting fats and oils by hydrogenation, unsaturated fatty acids in the fats and oils are changed to saturated fatty acids, whereby the melting points of the fats and oils become high along therewith. Therefore, the resulting fats and oils are not easy to handle, and when used in food, there arises such problems as a decreased meltability in the mouth. Also, because the setting of fats and oils by hydrogenation is carried out by the addition of hydrogen to double bonds in the fatty acids constituting fats and oils, the fatty acid composition of the fats and oils is completely different from that of the original ones. As the fatty acids constituting the fats and oils, there can be cited fatty acids which are appreciated with high values as their nutritional components, such as α-linolenic acid, γ-linolenic acid, eicosapentaenoic acid and docosahexaenoic acid. Since these fatty acids undergo changes in the chemical structure owing to setting of fats and oils by hydrogenation, their nutritional values owned by the original fatty acids may be lost in some cases. In addition, when hydrogenation is carried out, the level of LDL cholesterol, which has an adverse effect on the human body, increases, while the level of HDL cholesterol, which has favorable effects on the human body, decreases, as a result of transtransposition of double bonds, and trans-fatty acids, which are likely to promote cardiac coronary arteriosclerosis, are further formed. Therefore, the set fats and oils may in some cases be inappropriate to be used as a food component.

In the case of the conventional process of adding hardened oil, since it is required to blend the hardened oil in an amount of 20% by weight or more, the purity of the fats and oils may be drastically lowered.

DISCLOSURE OF INVENTION

The present inventors have found that an ester of a fatty acid having 20 or more carbon atoms has an action for setting fats and oils and is effective in solving the problems of the setting agent of fats and oils comprising such an ester owned by the prior art, and that it is more effective in the adjustment of the setting conditions of the fats and oils when the polyglycerol fatty acid ester of which HLB is 3 or less and/or the sucrose fatty acid ester of which HLB is 3 or less are further used in combination therewith, and thus completed the present invention.

Specifically, one embodiment of the present invention provides a setting agent of fats and oils comprising an ester of a fatty acid having 20 or more carbon atoms; another embodiment of the present invention provides fats and oils prepared by adding the setting agent of fats and oils to a raw material for fats and oils; and a still another embodiment of the present invention provides food comprising the fats and oils.

BEST MODE FOR CARRYING OUT THE INVENTION

Figure 1:
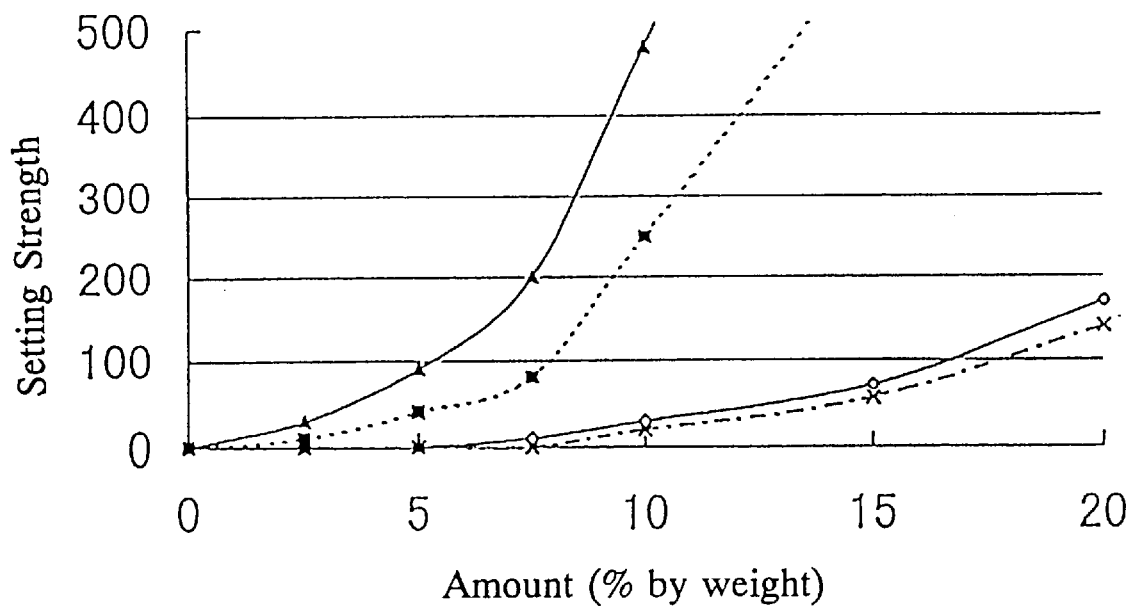
FIG. 1 is a graph showing the relationship between the amount of the setting agent of fats and oils or the hardened oil and the setting strength (gel strength) of the resulting fats and oils. In the figure, ■ shows the results for Example 1-5; ▲ shows the results for Example 1-6; ◇ shows the results for Comparative Example 1-2; and x shows the results for Comparative Example 1-3.

1. Setting Agent of Fats and Oils of the Present Invention

One of the big features of the setting agent of fats and oils of the present invention resides in that the setting agent of fats and oils comprises an ester of a fatty acid having 20 or more carbon atoms. In the present invention, the ester of a fatty acid is an ester resulting from using a fatty acid having 20 or more carbon atoms, preferably 22 or more carbon atoms. From the viewpoint of synthesis, the number of carbon atoms is preferably 30 or less, more preferably 26 or less. Particularly, the ester resulting from using a fatty acid having 22 carbon atoms is preferable. Since the ester of a fatty acid is used as the setting agent of fats and oils, there can be exhibited an excellent effect that contrary to the hydrogenation method, the fats and oils can be sufficiently set without undergoing changes in the fatty acid composition.

The ester of a fatty acid having 20 or more carbon atoms is not particularly limited. Examples thereof include ester compounds resulting from at least one compound selected from the group consisting of arachic acid and behenic acid, and at least one compound selected from the group consisting of propylene glycol, glycerol, sorbitan, pentaerythritol and diglycerol. Concretely, glycerol monobehenate, diglycerol monobehenate, propylene glycol monobehenate, sorbitan monoarachate, sorbitan diarachinate, and the like.

From the viewpoint of sufficiently setting the fats and oils, the content of the ester of a fatty acid having 20 or more carbon atoms in the setting agent of fats and oils of the present invention is preferably 10% by weight or more, more preferably 20% by weight or more, and the content is preferably 100% by weight or less, more preferably 90% by weight or less.

In addition, in the setting agent of fats and oils of the present invention, there may be further used in combination as an optional component at least one kind selected from the group consisting of polyglycerol fatty acid esters of which HLB is 3 or less and sucrose fatty acid esters of which HLB is 3 or less. In the present invention, there can be exhibited an excellent effect that the setting of the fats and oils and the adjustment of hardness of the resulting fats and oils (hereinafter referred to as setting strength) are further facilitated by the combined use of these compounds. Here, the term "HLB" in the present specification refers to an index of Hydrophile-Lipophile-Balance as determined by the HLB determination method described at pages 56–57 in "Sugar Ester Monogatari" (1984), edited by the Sugar Ester Monogatari Editorial Board, published by DAI-ICHI KOGYO SEIYAKU CO., LTD.

In addition to the ester of the fatty acid having 20 or more carbon atoms, when the polyglycerol fatty acid ester and sucrose fatty acid ester mentioned above are added to the setting agent of fats and oils, they may be added in an amount of 0 to 90% by weight to the setting agent of fats and oils.

The polyglycerol fatty acid ester of which HLB is 3 or less is not particularly limited, and examples thereof include diglycerol monostearate, triglycerol tetrapalmitate, triglycerol pentastearate, hexaglycerol pentastearate, hexaglycerol octastearate, decaglycerol decapalmitate, and the like. In addition, the sucrose fatty acid ester of which HLB is 3 or less is not particularly limited, and examples thereof include sucrose esters of palmitic acid, stearic acid, and the like.

The form of the setting agent of fats and oils of the present invention may be appropriately chosen in accordance with its purpose, and it is not particularly limited.

In addition, the raw materials for fats and oils that can be set with the setting agent of fats and oils of the present invention include, for example, vegetable oils such as soybean oil, rapeseed oil, cacao fat, cottonseed oil, palm oil, sesame oil, jojoba oil and corn oil; animal oils such as beef tallow, lard, fish oil and squalane; and mineral oils such as paraffins. In addition, the setting agent of fats and oils of the present invention can be used for a raw material for fats and oils obtained by mixing, separating, ester-exchanging or hydrogenating the raw materials mentioned as examples for fats and oils.

Since the setting agent of fats and oils of the present invention can serve to set the fats and oils without carrying out hydrogenation, or the like, it exhibits an excellent characteristic that the changes in the fatty acid composition in the raw materials for fats and oils can be suppressed, whereby obtaining a desired setting strength with a small amount thereof. In addition, when the setting agent of fats and oils of the present invention is used for fats and oils serving as edible raw materials, the setting agent of fats and oils of the present invention exhibits an excellent effect that the decrease in the nutritional value inherently owned by the fats and oils can be suppressed without forming trans-fatty acids which are harmful to the human body.

2. Fats and Oils Prepared by Adding Setting Agent of Fats and Oils of the Present Invention One of the big features of the fats and oils of the present invention resides in that the fats and oils are prepared by adding the setting agent of fats and oils of the present invention to a raw material for fats and oils. Since the fats and oils are prepared by adding the setting agent of fats and oils to the raw material for fats and oils, the fats and oils of the present invention exhibit an excellent effect that it can be set to a desired hardness without mixing, separation, ester-exchange or hydrogenation.

The amount of the setting agent of fats and oils in the fats and oils of the present invention can be adjusted as appropriate in accordance with its purposes, kinds, states of the raw materials for fats and oils, and other factors. From the viewpoint of sufficiently exhibiting an effect of setting the fats and oils, the amount is preferably 0.1% by weight or more, more preferably 0.5% by weight or more, as the amount of active ingredient(s) (amount of an ester of a fatty acid having 20 or more carbon atoms; or when further added with at least one kind selected from the group consisting of polyglycerol fatty acid esters of which HLB is 3 or less and sucrose fatty acid esters of which HLB is 3 or less, a sum of the amount of the ester of a fatty acid having 20 or more carbon atoms and the amount of at least one kind selected from the group consisting of polyglycerol fatty acid esters of which HLB is 3 or less and sucrose fatty acid esters of which HLB is 3 or less). From the viewpoint of maintaining high purity of the fats and oils, the amount is 20% by weight or less, preferably 10% by weight or less.

In the fats and oils of the present invention, the process for adding the setting agent of fats and oils is not particularly limited, as long as it is a process where the setting agent of fats and oils is homogeneously dissolved in the raw materials for fats and oils.

The setting strength of the fats and oils of the present invention is not particularly limited, and can be adjusted to various degrees in accordance with its purpose. The setting strength of the fats and oils can be adjusted by the amount of the aforementioned setting agent of fats and oils and other factors.

The form of the fats and oils of the present invention is not particularly limited, and can have various forms in accordance with its purpose. Examples include shortenings, frying oils and powdered fats and oils. While shortenings and frying oils are solid at usual preservation temperatures, they become liquid fats and oils when heated at the time of use.

In the case of the fats and oils of the present invention, they can be used as food materials for processing of various foods, raw materials for cosmetics, or the like. Shortenings, frying oils and powdered fats and oils will be hereinafter described as examples therefor.

(1) Shortening

The shortening in the present invention is prepared by blending one or more fats and oils each prepared by adding the setting agent of fats and oils of the present invention to a raw material for fats and oils, further adding an emulsifier, a flavor, and the like as occasion demands, blending these components with heating, and rapid-cooling and kneading the mixture.

The applications for the shortening in the present invention is not particularly limited, and examples thereof included shortening for confectionery/bakery kneading, chocolate substitute fat (hard butter), frying oils, margarine, fat spreads, various foaming agents, curry roux, and creams.

The raw materials for fats and oils are not particularly limited, and examples thereof include vegetable oils such as soybean oil, rapeseed oil, cottonseed oil, palm oil, coconut oil and sesame oil; and animal oils such as fish oil and milk fats. In addition, those fats and oils obtained from mixing, separating, ester-exchanging or hydrogenating the aforementioned raw materials for fats and oils may be also used in accordance with their purposes.

When the shortening in the present invention is produced, a flavor usually added in shortenings can be further blended.

In the shortening in the present invention, since the fats and oils prepared by adding the setting agent of fats and oils of the present invention are used and the properties of the fats and oils approximates that of the solid fats and oils to the raw material for fats and oils, when the food is cooked using the shortening, there is exhibited an excellent effect that there is a reduced stickiness, so that the deposition to wrapping paper is reduced when wrapping the shortening with wrapping paper, or the like.

(2) Frying Oil

The frying oil in the present invention is an oil comprising fats and oils prepared by adding the setting agent of fats and oils of the present invention to the raw material for fats and oils, and is an oil used for fry cooking. The feature of the frying oil resides in the use as fats and oils with heating in a frying process before being ingested as fats and oils. After the frying process, the frying oil is contained at from about 10 to about 40% by weight of the weight of the fried food, and is not particularly limited thereto.

In addition, as the food cooked using the frying oil of the present invention, it is not particularly limited as long as the cooking processes therefor include a frying process, and examples thereof include such foods as tempura, potato chips, donuts, pork cutlets, precooked frozen foods and instant noodles.

The raw materials for fats and oils are not particularly limited, and examples thereof include vegetable oils such as soybean oil, rapeseed oil, cottonseed oil, palm oil and sesame oil; and animal oils such as fish oil and lard. In addition, those fats and oils obtained from mixing, separating, ester-exchanging or hydrogenating the aforementioned raw materials for fats and oils may be also used in accordance with their purposes.

In the frying oil in the present invention, since the fats and oils prepared by adding the setting agent of fats and oils of the present invention to the raw material for fats and oils are used and the properties of the fats and oils approximate that of the solid fats and oils, when the food is cooked using the frying oil, there is exhibited an excellent effect that there is a reduced stickiness, so that the deposition to wrapping paper is reduced when wrapping the frying oil with wrapping paper, or the like.

(3) Powdered Fats and Oils

The powdered fats and oils of the present invention can be produced by converting a fat and oil prepared by adding the setting agent of fats and oils of the present invention to an oil-in-water (o/w) emulsion and removing water therefrom by spray drying, or the like, and is a powder in which oil drops are coated with a water-soluble component including, for instance, a protein such as casein, a carbohydrate such as gelatin, dextrin, lactose, and the like.

The applications of the powdered fats and oils of the present invention are not particularly limited, and examples thereof include powdered whipping creams, coffee creams, soups, processed meat raw materials, and the like. In addition, the fat and oil content in this case is usually 20 to 80% by weight, and is not particularly limited thereto.

The raw materials for fats and oils are not particularly limited, and examples thereof include vegetable oils such as soybean oil, rapeseed oil, cottonseed oil, palm oil and sesame oil; and animal oils such as fish oil and milk fats. In addition, those fats and oils obtained from mixing, separating, ester-exchanging or hydrogenating the aforementioned raw materials for fats and oils may be also used in accordance with their purposes.

Incidentally, when the powdered fats and oils are used as powdered whipping creams, coffee creams, and the like, the powdered fats and oils per se can be provided as foods.

When the powdered fats and oils are used as coffee creams, for instance, since the coffee creams comprise oils and fats prepared by adding the setting agent of fats and oils of the present invention to the raw material for fats and oils, the properties of the fats and oils approximate those of the solid fats and oils, whereby obtaining excellent dispersibility and dissolubility. In addition, since the setting agent of fats and oils has setting ability of fats and oils for a long period of time, excellent dispersibility and dissolubility can be maintained for a long period of time.

3. Food Comprising the Fats and Oils of the Present Invention

One of the big features of the food of the present invention resides in that the food comprises the fats and oils of the present invention. In the food of the present invention, since the properties of the fats and oils approximate that of solid fats and oils, it is made possible to provide a food with further excellent palatability, appearance, preservation ability, and the like by containing the fats and oils. In addition, the food of the present invention can maintain the palatability, appearance, preservation ability, and the like for a long period of time.

As the fats and oils, there can be cited fats and oils prepared by using raw materials for fats and oils usually used for foods.

In the food of the present invention, the content of the fats and oils of the present invention can be adjusted in accordance with its purpose, and is not particularly limited.

When the setting agent of fats and oils of the present invention is utilized in food, there may be used by adding emulsifiers, flavors, solid ingredients of skim milk, sugars, water, stabilizers, salts, seasonings, protein-based water retainers, and the like usually utilized for food.

When the fats and oils prepared by adding the setting agent of the present invention to the raw material for fats and oils is used for food, the emulsifier is not particularly limited. Examples thereof include glycerol fatty acid esters, sorbitan fatty acid esters, propylene glycol fatty acid esters, sucrose fatty acid esters, lecithin, and the like according to the Food Sanitation Act. Concretely, decaglycerol monostearate, citrate monoglyceride, diglycerol monostearate, sorbitan monostearate, propylene glycol monostearate, and the like.

The method for manufacturing the food of the present invention is not particularly limited in accordance with its purpose, form of use and other factors.

The food of the present invention is not particularly limited, and examples include powdered fats and oils, creams, cold confectionery, margarine and chocolates; and processed meat foods such as hams, bacon and sausages. Other processed foods include processed fish meat foods such as frozen "surimi," "kamaboko" and "chikuwa"; bread, tempura, potato chips, donuts, pork cutlets, frozen precooked foods, instant noodles, foaming agents and curry roux.

The processed foods obtained from further processing the aforementioned foods are also encompassed in the scope of the present invention.

Individual foods will be described hereinbelow.

(1) Cream

The cream of the present invention is prepared as an o/w emulsion using, as raw materials, fats and oils prepared by adding the setting agent of fats and oils of the present invention, a fat-free milk solid ingredient and water to the raw material for fats and oils, and further adding an emulsifier, sodium caseinate, or the like as occasion demands. The major applications for the cream of the present invention include whipping creams, coffee creams and culinary purposes.

The raw materials for fats and oils are not particularly limited, and examples thereof include vegetable oils such as soybean oil, rapeseed oil, cacao fat, cottonseed oil, palm oil and sesame oil; and animal oils such as beef tallow, lard, fish oil and milk fats. In addition, those fats and oils obtained from mixing, separating, ester-exchanging or hydrogenating the aforementioned raw materials for fats and oils may be also used in accordance with their purposes.

(2) Cold Confectionery

The cold confectionery of the present invention is prepared by forming an o/w emulsion using, as raw materials, fats or oils prepared by adding the setting agent of fats and oils of the present invention, a fat-free milk solid ingredient, a sugar and water to the raw material for fats and oils, together with an emulsifier, a stabilizer, and the like as occasion demands, and stirring and whipping the emulsion in a freezer. The cold confectionery refers to two types: soft cream type, distributed as a premix and finished in a freezer immediately before serving, and hard ice cream type, hardened at −40° C. for about 1 hour in the production process and packed in cups, wafer-like cakes, etc. In addition, the fat and oil content of the cold confectionery is about 3 to 15%, which is of the same level as those of usually commercially available confectionery, and is not particularly limited thereto.

The raw materials for fats and oils are not particularly limited, and examples thereof include vegetable oils such as soybean oil, rapeseed oil, cottonseed oil, palm oil and sesame oil; and animal oils such as fish oil and milk fats. In addition, those fats and oils obtained from mixing, separating, ester-exchanging or hydrogenating the aforementioned raw materials for fats and oils may be also used in accordance with their purposes.

In addition, in the cold confectionery in the present invention, a stabilizer, or the like usually used in cold confectionery may be added as occasion demands.

(3) Margarine

The margarine of the present invention is prepared by forming a w/o emulsion using, as raw materials, fats or oils prepared by adding the setting agent of fats and oils of the present invention and water to the raw material for fats and oils, and further adding thereto a fat-free milk solid ingredient, a sugar, a salt, an emulsifier, a stabilizer, and the like as occasion demands, and rapid-cooling and kneading the emulsion.

The applications for the margarine of the present invention include butter substitutes, confectionery/bakery, butter creams and home margarine, and the margarine of the present invention is also referred to as "fat spread" depending on its fat and oil contents. The fat and oil content of the margarine is about 40 to 90% by weight, and is not particularly limited thereto.

The raw materials for fats and oils are not particularly limited, and examples thereof include vegetable oils such as soybean oil, rapeseed oil, cottonseed oil, palm oil and sesame oil; and animal oils such as fish oil and milk fats. In addition, those fats and oils obtained from mixing, separating, ester-exchanging or hydrogenating the aforementioned raw materials for fats and oils may be also used in accordance with their purposes.

In addition, when manufacturing the margarine in the present invention, solid ingredients of skim milk, sugars, water, salts, stabilizers, and the like usually used in cold confectionery may be added as occasion demands.

(4) Chocolate

The chocolate of the present invention is manufactured by adding cacao mass and a sugar and/or powdered milk to the fats and oils prepared by adding the setting agent of fats and oils of the present invention to the raw material for fats and oils, together with an emulsifier, a flavor, and the like as occasion demands, subjecting the mixture to microgranulation, conching and subsequent tempering, and thereafter cooling and setting it. For some formulations, the no-tempering type where tempering is not carried out is produced.

The term "chocolate" as used herein is understood to include mold chocolates typically those in the form of plates and bars; and coating chocolates for cakes, ice creams and cookies. In addition, the fat and oil content of the chocolate is usually about 30 to 70% by weight, and is not particularly limited thereto.

The raw materials for fats and oils are not particularly limited, and examples thereof include vegetable oils such as soybean oil, rapeseed oil, cottonseed oil, palm oil, sesame oil, cacao fat and coconut oil; and animal oils such as fish oil and milk fats, without being limited thereto. In addition, those fats and oils obtained from mixing, separating, ester-exchanging or hydrogenating the aforementioned raw materials for fats and oils can be used in accordance with its purposes.

In addition, in the chocolate of the present invention, there may also be supplemented as occasion demands with a flavor usually added to chocolates.

(5) Processed Meat Food or Processed Fish Meat Food

The processed meat food or processed fish meat food of the present invention is prepared by mixing the fats and oils prepared by adding the setting agent of fats and oils of the present invention to the raw material for fats and oils, an emulsifier, a salt, a seasoning, a sugar, a stabilizer, a protein-based water retainer, and the like with meat or fish meat at a low temperature (0° to 10° C.), or dissolving them in water and making them compatible with the meat or fish meat by injection or another means, and cooked with heating. Examples thereof include processed meat foods such as hams, bacon and sausages, and processed fish meat foods such as frozen "surimi", "kamaboko" and "chikuwa."

The raw materials for fats and oils are not particularly limited, and examples thereof include vegetable oils such as soybean oil, rapeseed oil, cottonseed oil, palm oil, sesame oil, cacao fat and coconut oil; and animal oils such as fish oil and milk fats, without being limited thereto. In addition, those fats and oils obtained from mixing, separating, ester-exchanging or hydrogenating the aforementioned raw materials for fats and oils can be used in accordance with its purposes.

The processed meat food or processed fish meat food of the present invention can further be supplemented with salts, seasonings, sugars, stabilizers, protein-based water retainers, and the like as occasion demands.

The present invention will be described in detail on the basis of the working examples, and the like, without intending to restrict the scope of the present invention to these working examples, and the like.

EXAMPLES

Example 1

Example 1-1 (Preparation of Setting Agent of Fats and Oils)

Glycerol monobehenate in an amount of 50% by weight and hexaglycerol octastearate (HLB=1.5) in an amount of 50% by weight were mixed with heating at 90° C. for 5 minutes, and the resulting mixture was cooled to 20° C., whereby giving a setting agent of fats and oils.

Example 1-2 (Preparation of Set Fats and Oils)

To soybean oil in an amount of 97% by weight was added glycerol monobehenate (inventive product) in an amount of 3% by weight, and the resulting mixture was heated and dissolved at 90° C. for 10 minutes. Thereafter, the resulting solution was cooled to 10° C., whereby giving set fats and oils.

Example 1-3 (Preparation of Set Fats and Oils)

To fish oil in an amount of 96% by weight were added sorbitan monoarachate in an amount of 2% by weight and sucrose stearate (HLB=1) (inventive product) in an amount of 2% by weight, and the resulting mixture was heated and dissolved at 90° C. for 10 minutes. Thereafter, the resulting solution was cooled to 10° C., whereby giving set fats and oils.

Example 1-4 (Preparation of Set Fats and Oils)

To soybean oil in an amount of 94% by weight was added the setting agent of fats and oils of Example 1-1 in an amount of 6% by weight, and the resulting mixture was heated and dissolved at 90° C. for 10 minutes. Thereafter, the resulting solution was cooled to 10° C., whereby giving set fats and oils.

Example 1-5 (Preparation of Set Fats and Oils)

To rapeseed oil was added glycerol monobehenate in an amount of 0%, 2.5%, 5%, 7.5%, 10%, 15% or 20% by weight as a setting agent of fats and oils, and each of the mixture was heated and dissolved at 90° C. for 10 minutes. Thereafter, the resulting solution was cooled to 10° C., whereby giving each of set fats and oils.

Example 1-6 (Preparation of Set Fats and Oils)

The setting agent of fats and oils of Example 1-5 was replaced with glycerol monobehenate and hexaglycerol octastearate of HLB=1 [mixing ratio=1:1 (weight ratio)], to prepare in the same manner as in Example 1-5.

Example 1-7 (Cream)

A whipped cream was prepared with the following composition using the preparation product (set fats and oils) of Example 1-2 as fats and oils.

| | |
|---|---|
| Fats and Oils | 40% by weight |
| Powdered Skim Milk | 4% by weight |
| Sodium Hexametaphosphate | 0.1% by weight |
| Sugar | 7% by weight |
| Sodium Caseinate | 2% by weight |
| Flavor | Trace |
| Water | Balance |

All raw materials were heated and dissolved a 90° C. for 5 minutes and emulsified with a homogenizer [manufactured by Sanwa Kikai (K.K.); the trade name: "Model H-10"] at 150 kg/cm$^2$, and the emulsion was aged overnight. The resulting emulsion was whipped for 3 minutes with a Hobert mixer (manufactured by Kitchen Aid Inc.; the trade name: "SK-10"), to give a whipped cream.

Example 1-8 (Cream)

The fats and oils of Example 1-7 were replaced with the set fats and oils obtained in Example 1-4, to prepare a whipped cream in the same manner.

Comparative Example 1-1 (Fats and Oils)

To soybean oil in an amount of 95% by weight was added glycerol monostearate in an amount of 5% by weight. Subsequently, the mixture was heated and dissolved at 90° C. for 10 minutes, and thereafter, the resulting solution was cooled to 10° C., but only the lower layer portion was set, so that the whole portion did not become homogeneous.

Comparative Example 1-2 (Preparation of Fats and Oils)

Glycerol monostearate was used in place of the setting agent of fats and oils of Example 1-5, to prepare in the same manner as in Example 1-5.

Comparative Example 1-3 (Preparation of Fats and Oils)

Soybean fully hydrogenated oil was used in place of the setting agent of fats and oils of Example 1-5, to prepare in the same manner as in Example 1-5.

Comparative Example 1-4 (Cream)

The fats and oils of Example 1-7 were replaced with a coconut hardened oil, to prepare a whipped cream in the same manner.

Test Example 1-1 (Setting Strength of Fats and Oils)

The setting strength of fats and oils was evaluated by measuring the gel strength of the fats and oils obtained in Examples 1-5 and 1-6 and Comparative Examples 1-2 and 1-3 as determined with a rheometer by the repulsion strength at 1 cm push. The results thereof are shown in FIG. 1 and Table 1.

TABLE 1

| Amount of Setting Agent for Fats and Oils Added (% by weight) | 0 | 2.5 | 5 | 7.5 | 10 | 15 | 20 |
|---|---|---|---|---|---|---|---|
| Setting Strength | | | | | | | |
| Example 1-5 | 0 | 30 | 90 | 200 | 480 | 1000 | —[1] |
| Example 1-6 | 0 | 10 | 40 | 80 | 250 | 600 | —[1] |
| Comparative Example 1-2 | 0 | 0 | 0 | 10 | 30 | 70 | 170 |
| Comparative Example 1-3 | —[1] | 0 | 0 | 0 | 20 | 55 | 140 |

[1]Measurement omitted.

It is shown from the results in FIG. 1 and Table 1 that the fats and oils obtained in Examples 1-5 and 1-6 can obtain a desired setting strength with a smaller amount of the setting agent of fats and oils added, as compared with those of the fats and oils obtained in Comparative Example 1-2 (the ester of a fatty acid having 18 carbon atoms) and Comparative Example 1-3. In addition, it is shown from the results in Examples 1-5 and 1-6 that since a setting agent of fats and oils using hexaglycerol octastearate having HLB of 3 or less is further used in addition to glycerol monobehenate, which is an ester of a fatty acid having 22 carbon atoms, a desired setting strength can be obtained with an even smaller amount of the setting agent of the fats and oils added.

Test Example 1-2 (Cream)

The evaluation results of each of whipped creams obtained in Examples 1-7 and 1-8 and Comparative Example 1-4 are shown in Table 2.

Incidentally, the palatability, the flower-forming property upon squeezing and the shape retention were evaluated by 20 selected monitors. In addition, the flower-forming property upon squeezing was evaluated by filling the whipped cream into a squeezing sack, squeezing into a flower shape, and visually observing the formed shape. In addition, the shape retention was evaluated by visually observing the shape of the flower shape obtained as described above after 60 minutes.

TABLE 2

| | Palatability | Flower-Forming Property | Shape Retention |
|---|---|---|---|
| Example 1-7 | Smooth and excellent | Excellent | Slightly distorted |
| Example 1-8 | Smooth and excellent | Excellent | Excellent |

TABLE 2-continued

|  | Palatability | Flower-Forming Property | Shape Retention |
|---|---|---|---|
| Comparative Example 1-4 | Slightly poor meltability in mouth | Hard, with cracks in folds | Excellent |

It is shown from the results in Table 2 that the whipped creams obtained in Examples 1-7 and 1-8 exhibit an effect of setting the fats and oils without carrying out such treatments as hydrogenation to the fats and oils used, since the setting agent of fats and oils of the present invention is used, as compared with the whipped cream of Comparative Example 1-4, thereby making them extremely effective in improving the palatability of the fats and oils and the food comprising the fats and oil. Further, it is shown that the whipped creams of Examples 1-7 and 1-8 have excellent flower-forming property upon squeezing and shape retention.

Example 2 (Shortening)

Example 2-1

To rapeseed oil in an amount of 93% by weight was added glycerol monobehenate in an amount of 7% by weight, and the ingredients were mixed with heating at 90° C. for 10 minutes. Thereafter, the resulting mixture was rapidly cooled to 10° C. and then kneaded, whereby giving shortening. There was obtained smooth and glossy shortening.

Example 2-2

To soybean oil in an amount of 90% by weight were added propylene glycol monobehenate in an amount of 5% by weight and triglycerol pentastearate in an amount of 5% by weight, and the shortening was prepared in the same manner as in Example 2-1. There was obtained smooth and glossy shortening.

Example 2-3

To corn oil in an amount of 80% by weight and palm oil in an amount of 15% by weight was added glycerol monobehenate in an amount of 5% by weight, and the shortening was prepared in the same manner as in Example 2-1. There was obtained homogeneous shortening having excellent fluidity.

Example 2-4

To corn oil in an amount of 80% by weight and palm oil in an amount of 15% by weight were added glycerol monobehenate in an amount of 2.5% by weight and hexaglycerol octastearate (HLB=1.5) in an amount of 2.5% by weight, and the shortening was prepared in the same manner as in Example 2-1. There was obtained homogeneous shortening having excellent fluidity.

Comparative Example 2-1

To rapeseed oil in an amount of 93% by weight was added rapeseed hardened oil in an amount of 7% by weight, and the shortening was prepared in the same manner as in Example 2-1. There was obtained shortening which was not smooth because the crystals precipitated.

Comparative Example 2-2

To corn oil in an amount of 80% by weight and palm oil in an amount of 15% by weight was added glycerol monostearate (18 carbon atoms) in an amount of 5% by weight, and the shortening was prepared in the same manner as in Example 2-1. The liquid oil separation was slightly observed in the upper portion.

Test Example 2-1

Bread was prepared by adding the shortening obtained in each of Examples 2-3 and 2-4 and Comparative Example 2-2 to bread composition in the following blending proportions.

| Extra-Strength Flour | 100 Parts |
|---|---|
| Sugar | 5 Parts |
| Salt | 2 Parts |
| Shortening | 7 Parts |
| Yeast | 1.5 Parts |
| Yeast Food | 0.2 Parts |
| Powdered Skim Milk | 1 Part |
| Water | 60 Parts |

All raw materials were kneaded and then fermented at 27° C. for 90 minutes. The mixture was poured into a mold, and put into proof at 37° C. for 40 minutes, and then baked at 205° C. for 45 minutes.

The evaluation results for the resulting bread are shown in Table 3.

Incidentally, the palatabilities (meltability in mouth, moisture) of the resulting bread were evaluated by 20 selected monitors. In addition, the preservation ability was evaluated by measuring the softness of the bread as determined by with a rheometer the repulsion strength at 1 cm push. Incidentally, as to the preservation ability, smaller the numerical values, more excellent the preservation ability.

TABLE 3

|  | Palatability | | Preservation Ability | |
|---|---|---|---|---|
|  | Meltability in Mouth | Moisture | First Day | 3 Days After Refrigeration |
| Example 2-3 | Excellent | Excellent | 40 | 70 |
| Example 2-4 | Excellent | Excellent | 35 | 60 |
| Comparative Example 2-2 | Slightly Sticky | Poor | 43 | 150 |

It is shown from the results in Table 3 that each bread of Examples 2-3 and 2-4 is more excellent in the palatabilities and in the preservation ability, since the shortening of the present invention is used, as compared with the bread of Comparative Example 2-2.

Example 3 (Frying Oil)

Example 3-1

To 100 parts of a commercially available cake donut mix powder (manufactured by Nippon Flour Mills Co., Ltd.; the trade name of "Cake Donut Mix Regulator") was added 50 parts of water to prepare a mix. The resulting mix was fried at 170° C. for 5 minutes in a frying oil, prepared by adding glycerol monobehenate in an amount of 1% by weight and hexaglycerol pentastearate (HLB=1.5) in an amount of 3% by weight to rapeseed oil in an amount of 96% by weight and dissolving the ingredients with heating, to give a cake donut.

Example 3-2

The frying oil of Example 3-1 was replaced with an oil prepared by adding glycerol monobehenate in an amount of 3% by weight and hexaglycerol octastearate (HLB=1.5) in an amount of 3% by weight to lard in an amount of 94% by weight, to give a cake donut.

Example 3-3

The frying oil of Example 3-1 was replaced with an oil prepared by adding glycerol monobehenate in an amount of 3% by weight to soybean oil in an amount of 97% by weight, to give a cake donut.

Example 3-4

Commercially available raw Chinese noodles were steamed for 2 minutes, and the resulting noodles were fried at 160° C. for 1 minute and 30 seconds in a frying oil prepared by adding diglycerol monobehenate in an amount of 2% by weight and hexaglycerol octastearate (HLB=1.5) in an amount of 3% by weight to soybean oil in an amount of 95% by weight and dissolving the ingredients with heating, to give instant noodles. The noodles were cooked with boiling water, to give noodles with excellent appearance and palatabilities.

Example 3-5

The frying oil of Example 3-4 was replaced with an oil prepared by adding sorbitan monoarachate in an amount of 2% by weight and sucrose stearate (HLB=1) in an amount of 2% by weight to lard in an amount of 96% by weight, to give instant noodles. The noodles were cooked with boiling water, to give noodles with excellent appearance and palatabilities.

Example 3-6

The frying oil of Example 3-4 was replaced with an oil prepared by adding glycerol monobehenate in an amount of 2% by weight and triglycerol tetrapalmitate (HLB=3) in an amount of 1% by weight to rapeseed oil in an amount of 97% by weight, to give instant noodles. The noodles were cooked with boiling water, to give noodles with excellent appearance and palatabilities.

Example 3-7

Raw potatoes were peeled and then sliced into 1 to 2 mm thicknesses, and the slices were washed with water and drained. The sliced potatoes were fried at 150° C. for 4 minutes in the frying oil of Example 3-1, to give potato chips.

Example 3-8

The frying oil of Example 3-7 was replaced with the frying oil of Example 3-4, to give potato chips in the same manner.

Comparative Example 3-1

The frying oil of Example 3-1 was replaced with rapeseed oil, to give a cake donut in the same manner.

Comparative Example 3-2

The frying oil of Example 3-1 was replaced with an oil prepared by adding together soybean oil in an amount of 97% by weight and glycerol monostearate in an amount of 3% by weight, to give a cake donut in the same manner.

Comparative Example 3-3

The frying oil of Example 3-4 was replaced with soybean oil, to give instant noodles in the same manner.

Comparative Example 3-4

The frying oil of Example 3-4 was replaced with palm oil, to give instant noodles in the same manner.

Comparative Example 3-5

The frying oil of Example 3-7 was replaced with lard oil, to give potato chips in the same manner.

Comparative Example 3-6

The frying oil of Example 3-7 was replaced with a mixed oil of cottonseed oil in an amount of 50% by weight and lard oil in an amount of 50% by weight, to give potato chips in the same manner.

Test Example 3

The evaluation results for the cake donuts obtained in Examples 3-1 to 3-3 and Comparative Examples 3-1 and 3-2 are shown in Table 4. The states of the resulting cake donuts and the palatability were evaluated by 20 selected monitors.

TABLE 4

|  | State of Cake Donut | Palatability |
| --- | --- | --- |
| Example 3-1 | Excellent without stickiness | Excellent with crispness |
| Example 3-2 | Excellent without stickiness | Excellent with crispness |
| Example 3-3 | Excellent without stickiness | Excellent with crispness |
| Comparative Example 3-1 | Sticky surface | Oily with poor meltability in mouth |
| Comparative Example 3-2 | Sticky surface | Poor meltability in mouth |

It is shown from the results in Table 4 that the cake donuts of Examples 3-1 to 3-3 are more excellent in their states and in the palatabilities, since the frying oil of the present invention is used, as compared with the cake donuts of Comparative Examples 3-1 and 3-2.

Next, the evaluation results of the instant noodles obtained in Examples 3-4 to 3-6 and Comparative Examples 3-3 and 3-4 are shown in Table 5.

Incidentally, the states of the resulting instant noodles immediately after preparation, the states of the noodles after cooking with boiling water, and the palatabilities were evaluated by 20 selected monitors.

TABLE 5

|  | State of Instant Noodles | State of Cooking in Hot Water | Palatability of Cooking in Hot Water |
| --- | --- | --- | --- |
| Example 3-4 | Excellent without stickiness | Clean surface and excellent recovery | Smooth and soft and excellent |
| Example 3-5 | Excellent without stickiness | Clean surface and excellent recovery | Smooth and soft and excellent |
| Example 3-6 | Excellent without stickiness | Clean surface and excellent recovery | Smooth and soft and excellent |

TABLE 5-continued

| | State of Instant Noodles | State of Cooking in Hot Water | Palatability of Cooking in Hot Water |
|---|---|---|---|
| Comparative Example 3-3 | Surface with stickiness | Broken into pieces while cooking | Slightly poor meltability in mouth |
| Comparative Example 3-4 | Surface with stickiness | Broken into pieces while cooking | Poor meltability in mouth |

It is shown from the results in Table 5 that the instant noodles of Examples 3-4 to 3-6 are more excellent in their states of the resulting instant noodles immediately after preparation, the states of the noodles after cooking with boiling water, and the palatabilities, since the frying oil of the present invention is used, as compared with the instant noodles of Comparative Examples 3-3 and 3-4.

The evaluation results of the potato chips obtained in Examples 3-7 and 3-8 and Comparative Examples 3-5 and 3-6 are shown in Table 6.

Incidentally, the states of the resulting potato chips and the palatabilities were evaluated by 20 selected monitors.

TABLE 6

| | State of Potato Chips | Palatability |
|---|---|---|
| Example 3-7 | Dry, with no surface stickiness | Very excellent, crispness in palatability |
| Example 3-8 | No surface stickiness | Very excellent, crispness in palatability |
| Comparative Example 3-5 | Surface stickiness | Slightly poor meltability in mouth |
| Comparative Example 3-6 | Surface stickiness | Poor meltability in mouth, rough texture |

It is shown from the results in Table 6 that the potato chips of Examples 3-7 and 3-8 are more excellent in their states and in the palatabilities, since the frying oil of the present invention is used, as compared with the potato chips of Comparative Examples 3-5 and 3-6.

Example 4 (Powdered Fats and Oils)

Example 4-1

Powdered fats and oils were prepared with the following composition.

| Fats and Oils | 75 parts by weight |
|---|---|
| Dextrin | 15 parts by weight |
| Sodium Caseinate | 10 parts by weight |
| Water | 150 parts by weight |

To a solution prepared by dissolving dextrin and sodium caseinate in water were supplied fats and oils (set fats and oils) prepared by adding glycerol monobehenate in an amount of 8% by weight to soybean oil in an amount of 92% by weight as fats and oils, and the resulting mixture was emulsified with a homogenizer at 200+50 kg/cm², to give an oil-in-water emulsion. This emulsion was spray-dried with a spray-dryer (manufactured by Ohkawara Kakoki; the trade name of "DC-16"), to give powdered fats and oils.

Example 4-2

Powdered fats and oils were prepared with the following composition.

| A | Fats and Oils | 55 parts by weight |
|---|---|---|
| A | Diglycerol Monostearate | 3 parts by weight |
| A | Propylene Glycol Monostearate | 5 parts by weight |
| A | Lecithin | 0.7 parts by weight |
| B | Powdered Skim Milk | 5 parts by weight |
| B | Sodium Caseinate | 1 part by weight |
| B | Dextrin | 20 parts by weight |
| B | Sugar | 10 parts by weight |
| B | Dipotassium Hydrogen Phosphate | 0.2 parts by weight |
| B | Carrageenan (Stabilizer) | 0.1 parts by weight |
| B | Water | 200 parts by weight |

As fats and oils, there were used fats and oils (set fats and oils) prepared by adding glycerol monoarachate in an amount of 2% by weight and triglycerol pentastearate (HLB=1) in an amount of 2% by weight to corn oil in an amount of 50% by weight and palm oil in an amount of 46% by weight, and an oil layer constituted by A was homogeneously dissolved. After homogeneously dissolving the aqueous layer constituted by B, thereto was added with stirring the oil layer constituted by A. The mixture was further emulsified with a homogenizer at 100+50 kg/cm², to give an oil-in-water emulsion. This emulsion was spray-dried with a spray-dryer, to give powdered fats and oils.

Example 4-3

Powdered fats and oils for coffee creams were prepared with the following composition.

| A | Fats and Oils | 30 parts by weight |
|---|---|---|
| A | Diglycerol Monostearate | 1 part by weight |
| A | Citrate Monoglyceride | 0.4 parts by weight |
| A | Sorbitan Monostearate | 0.3 parts by weight |
| B | Dextrin | 63 parts by weight |
| B | Powdered Skim Milk | 3 parts by weight |
| B | Sodium Caseinate | 1.5 parts by weight |
| B | Disodium Hydrogen Phosphate | 0.4 parts by weight |
| B | Gum Arabic | 0.2 parts by weight |
| B | Carrageenan (Stabilizer) | 0.2 parts by weight |
| B | Water | 100 parts by weight |

As fats and oils, there were used fats and oils (set fats and oils) prepared by adding glycerol monobehenate in an amount of 3% by weight and sucrose stearate (HLB=2) in an amount of 1% by weight to rapeseed oil in an amount of 60% by weight and palm oil in an amount of 34% by weight, and an oil layer constituted by A was homogeneously dissolved. Subsequently, the powdered fats and oils were obtained in the same manner as in Example 4-2.

Comparative Example 4-1

The fats and oils of Example 4-1 were replaced with soybean oil in an amount of 100% by weight, to give powdered fats and oils in the same manner.

Comparative Example 4-3

The fats and oils of Example 4-3 were replaced with a mixed oil of rapeseed oil in an amount of 60% by weight and palm oil in an amount of 40% by weight, to give powdered fats and oils for coffee creams in the same manner.

Test Example 4-1

The evaluation results of the dispersibility against water of the powdered fats and oils of Example 4-1 and Comparative Example 4-1 with respect to changes with the passage of time are shown in Table 7.

Incidentally, the dispersibility of the powdered fats and oils was evaluated by visual observation of 20 selected monitors.

TABLE 7

| | Dispersibility | | | |
|---|---|---|---|---|
| | At Preparation | After 1 Month | After 2 Months | After 3 Months |
| Example 4-1 | Excellent dispersion dissolution | Excellent dispersion dissolution | Excellent dispersion dissolution | Excellent dispersion dissolution |
| Comparative Example 4-1 | Excellent dispersion dissolution | Slightly lumpy and poor dissolution | Largely lumpy and poor dissolution | Poor dissolution and fats and oil separation |

It is shown from the results in Table 7 that the powdered fats and oils of Example 4-1 are more excellent in the dispersibility against water as compared with the powdered fats and oils of Comparative Example 4-1, showing a small change in the dispersibility with the passage of time.

Test Example 4-2

The evaluation results of the powdered fats and oils for whipping creams of Example 4-2 and Comparative Example 4-2 are shown in Table 8.

Incidentally, the dispersibility and the whipping cream test (whipping property and shape retention) of the powdered fats and oils for whipping cream were evaluated by visually observation of 20 selected monitors. Incidentally, the whipping cream test was carried out by adding water in an amount of 100 parts by weight to the powdered fats and oils in an amount of 100 parts by weight, and whipping with a Hobert mixer for 3 minutes to evaluate the whipping property and the shape retention.

TABLE 8

| | | Whipping Cream Test | |
|---|---|---|---|
| | Dispersibility | Whipping Property (overrun) | Shape Retention |
| Example 4-2 | Excel. dispersion dissolution | 120% | Excellent |
| Comparative Example 4-2 | Slightly lumpy, poor dissolution dissolution | 100% | Distortion in flower forming |

It is shown from the results in Table 8 that the powdered fats and oils for whipping cream of Example 4-2 are more excellent in the dispersibility, the whipping property and the shape retention, as compared with the powdered fats and oils for whipping cream of Comparative Example 4-2.

Test Example 4-3

The evaluation results of the powdered fats and oils for coffee creams of Example 4-3 and Comparative Example 4-3 are shown in Table 9.

Incidentally, the dispersibility and the test for coffee creams (dissolvability and whiteness) of the powdered fats and oils for coffee creams were evaluated by visually observation of 20 selected monitors.

TABLE 9

| | | Test for Coffee Cream | |
|---|---|---|---|
| | Dispersibility | State of Dissolution | Whiteness |
| Example 4-3 | Excel. dispersion dissolution | Excellent | Excellent |
| Comparative Example 4-3 | Slightly lumpy with oiling-off | Slight showing oiling-off | Excellent |

It is shown from the results in Table 9 that the powdered fats and oils for coffee cream of Example 4-3 are more excellent in the dispersibility, the dissolvability and the whiteness, as compared with the powdered fats and oils for coffee cream of Comparative Example 4-3.

Example 5 (Cream)

Example 5-1

A whipping cream was prepared with the following composition.

| | |
|---|---|
| Fats and Oils | 45% by weight |
| Powdered Skim Milk | 4% by weight |
| Sodium Caseinate | 1% by weight |
| Sucrose Fatty Acid Ester (HLB = 11) | 0.3% by weight |
| Soybean Lecithin | 0.3% by weight |
| Sodium Hexametaphosphate | 0.1% by weight |
| Flavor | Trace |
| Water | Balance |

All raw materials were heated and dissolved at 90° C. for 10 minutes and emulsified with a homogenizer at 150 kg/cm$^2$ using fats and oils (set fats and oils) prepared by adding glycerol monobehenate in an amount of 3% by weight to soybean oil in an amount of 97% by weight as fats and oils, and the emulsion was aged overnight. The resulting emulsion was whipped with a Hobert mixer for 3 minutes, to give a whipped cream.

Example 5-2

The fats and oils of Example 5-1 were replaced with fats and oils (set fats and oils) prepared by adding glycerol monobehenate in an amount of 3% by weight and hexaglycerol pentastearate (HLB=1.5) in an amount of 3% by weight to soybean oil in an amount of 94% by weight, to give a whipped cream in the same manner.

Example 5-3

The fats and oils of Example 5-1 were replaced with fats and oils prepared by adding sorbitan diarachate in an amount of 2% by weight and sucrose stearate (HLB=1) in an amount of 2% by weight to rapeseed oil in an amount of 48% by weight and palm oil in an amount of 48% by weight, to give a whipped cream in the same manner.

Example 5-4

The fats and oils of Example 5-1 were replaced with fats and oils prepared by adding glycerol monobehenate in an amount of 2% by weight and triglycerol tetrapalmitate (HLB=3) in an amount of 1% by weight to milk fat in an amount of 97% by weight, to give a whipped cream in the same manner.

Example 5-5

A coffee cream was prepared with the following composition.

| | |
|---|---|
| Fats and Oils | 30% by weight |
| Powdered Skim Milk | 3% by weight |
| Sodium Caseinate | 3% by weight |
| Disodium Hydrogen Phosphate | 0.2% by weight |
| Decaglycerol Monostearate (HLB = 13) | 0.2% by weight |
| Citrate Monoglyceride | 0.2% by weight |
| Flavor | Trace |
| Water | Balance |

All raw materials were heated and dissolved at 90° C. for 10 minutes and emulsified with a homogenizer at 400 kg/cm$^2$ using fats and oils prepared by adding glycerol monobehenate in an amount of 1% by weight and hexaglycerol pentastearate (HLB=1.5) in an amount of 3% by weight to rapeseed oil in an amount of 96% by weight. The resulting emulsion was cooled to 10° C. and filled into a cup to give a coffee cream.

Example 5-6

The fats and oils of Example 5-5 were replaced with fats and oils prepared by adding diglycerol monobehenate in an amount of 2% by weight to palm oleic oil in an amount of 49% by weight and milk fat in an amount of 49% by weight, to give a coffee cream in the same manner.

Comparative Example 5-1

The fats and oils of Example 5-1 were replaced with soybean oil, to give a whipped cream in the same manner.

Comparative Example 5-2

The fats and oils of Example 5-1 were replaced with fats and oils prepared by adding glycerol monostearate in an amount of 3% by weight to soybean oil in an amount of 97% by weight, to give a whipped cream in the same manner.

Comparative Example 5-3

The fats and oils of Example 5-1 were replaced with palm oil, to give a whipped cream in the same manner.

Comparative Example 5-4

The fats and oils of Example 5-5 were replaced with rapeseed oil, to give a coffee cream in the same manner.

Comparative Example 5-5

The fats and oils of Example 5-5 were replaced with a mixed oil of palm oleic oil in an amount of 50% by weight and milk fat in an amount of 50% by weight, to give a coffee cream in the same manner.

Test Example 5

The evaluation results of the whipped creams of Examples 5-1 to 5-4 and Comparative Example 5-1 to 5-3 are shown in Table 10.

Incidentally, the palatability, the flower-forming property upon squeezing and the shape retention were evaluated by 20 selected monitors in the same manner as in Test Example 2.

TABLE 10

| | Palatability | Flower-Forming Property | Shape Retention |
|---|---|---|---|
| Example 5-1 | Smooth and excellent | Excellent | Slightly distorted |
| Example 5-2 | Smooth and excellent | Excellent | Excellent |
| Example 5-3 | Smooth and excellent | Excellent | Excellent |
| Example 5-4 | Smooth and excellent | Excellent | Excellent |
| Comparative Example 5-1 | Sticky and poor | Not capable of forming flower | Poor |
| Comparative Example 5-2 | Slightly sticky | Not capable of forming flower | Poor |
| Comparative Example 5-3 | Poor meltability in mouth | Hard, with cracks in folds | Excellent |

It is shown from the results in Table 10 that the whipped creams of Examples 5-1 to 5-4 are more excellent in the palatability, the flower-forming property upon squeezing and the shape retention, as compared with the whipped creams of Comparative Examples 5-1 to 5-3.

The evaluation results of the coffee creams of Examples 5-5 and 5-6 and Comparative Examples 5-4 and 5-5 are shown in Table 11.

Incidentally, the coffee tests (oily ingredient separation and feathering) and the preservation test (appearance) were evaluated by 20 selected monitors. In addition, the preservation test (changes in viscosities) was evaluated by the degree of changes in the viscosities measured between the viscosity of the coffee creams immediately after preparation and that of the coffee creams one month after the preparation.

TABLE 11

| | Coffee Test | | Preservation Test (after one month) | |
|---|---|---|---|---|
| | Oily Ingredient Separation | Feathering | Changes in Viscosity | Appearance |
| Example 5-5 | None | None | None | Excellent |
| Example 5-6 | None | None | None | Excellent |
| Comparative Example 5-4 | Some | Slightly | Slightly increased | Generation of separation of water |
| Comparative Example 5-5 | Some | Some | Increased | Lumpy, generation of separation of water |

It is shown from the results in Table 11 that the coffee creams of Examples 5-5 and 5-6 are more excellent in the changes in viscosities and the appearance without causing oily ingredient separation and feathering, as compared with the coffee creams of Comparative Examples 5-4 and 5-5.

Example 6 (Cold Confectionery)

Example 6-1

An ice cream was prepared with the following composition.

| Fats and Oils | 6% by weight |
|---|---|
| Powdered Skim Milk | 6% by weight |
| Sugar | 8% by weight |
| Powdery Thick Malt Syrup | 12% by weight |
| Locust Bean Gum | 0.15% by weight |
| Carrageenan | 0.05% by weight |
| Diglycerol Monostearate (HLB = 0.5) | 0.3% by weight |
| Flavor | Trace |
| Water | Balance |

All raw materials were heated and dissolved at 90° C. for 10 minutes and emulsified with a homogenizer at 150 kg/cm$^2$ using fats and oils prepared by adding glycerol monobehenate in an amount of 3% by weight to corn oil in an amount of 97% by weight. The resulting emulsion was aged overnight at 10° C. The emulsion was freezed in a freezer to be hardened at −40° C. for one hour, to give an ice cream.

Example 6-2

The fats and oils of Example 6-1 were replaced with fats and oils prepared by adding glycerol monobehenate in an amount of 3% by weight and triglycerol pentastearate (HLB=1) in an amount of 3% by weight to rapeseed oil in an amount of 94% by weight, to give an ice cream in the same manner.

Example 6-3

The fats and oils of Example 6-1 were replaced with fats and oils prepared by adding sorbitan diarachate in an amount of 5% by weight to soybean oil in an amount of 95% by weight, and all raw materials were heated and dissolved at 80° C. for 10 minutes. Thereafter, the mixture was passed through UHT sterilizer (145° C., 2 seconds, homogenizer pressure 150 kg/cm$^2$), and then aseptically packed, to give a soft cream mix. After one month later, the soft cream mix was freezed in a freezer for soft creams, to give a soft cream having excellent appearance and palatability.

Example 6-4

The amount of the fats and oils of Example 6-1 was changed to 13% by weight and that of the powdered skim milk was changed to 10% by weight, to prepare a high-fat content ice cream. The soft ice cream excellent in the appearance and the palatabilities was obtained.

Comparative Example 6-1

The fats and oils of Example 6-1 were replaced with corn oil to be prepared in the same manner. However, the fats and oils were separated during freezing, so that an ice cream could not be obtained.

Comparative Example 6-2

The fats and oils of Example 6-1 were replaced with palm hardened oil (36° C.), to give an ice cream in the same manner.

Test Example 6

The evaluation results of the ice creams obtained in Examples 6-1 and 6-2 and Comparative Example 6-2 are shown in Table 12.

Incidentally, the palatability and the shape retention (appearance and melting state) were evaluated by the visual observation of 20 selected monitors on the appearance (changes in shapes) and the melting state when keeping the ice cream in a thermostatic chamber at 25° C. for 30 minutes.

TABLE 12

| | | Shape Retention | |
|---|---|---|---|
| | Palatability | Appearance | Melting |
| Example 6-1 | Smooth and excellent | Slightly distorted | None |
| Example 6-2 | Smooth and excellent | Excellent | None |
| Comparative Example 6-2 | Poor meltability in mouth, rough texture | Slightly distorted | Melted at small amounts |

It is shown from the results in Table 12 that the ice creams of Examples 6-1 and 6-2 are more excellent in the palatability and the shape retention, as compared with the ice cream of Comparative Example 6-2.

Example 7

Example 7-1

Margarine was prepared with the following composition.

| Fats and Oils | 81.2% by weight |
|---|---|
| Water | Balance |
| Salt | 1.5% by weight |
| Powdered Skim Milk | 2% by weight |
| Lecithin | 0.3% by weight |
| Flavor, Colorant | Appropriate amounts |

Using fats and oils prepared by adding glycerol monobehenate in an amount of 5% by weight to rapeseed oil in an amount of 95% by weight, the mixture was emulsified, rapid-cooled and kneaded, to give a margarine which was excellent in appearance and meltability in mouth.

Example 7-2

The fats and oils of Example 7-1 were replaced with fats and oils prepared by adding glycerol monobehenate in an amount of 3% by weight and triglycerol pentastearate in an amount of 3% by weight to corn oil in an amount of 94% by weight, to give a margarine in the same manner. The resulting margarine was excellent in appearance and meltability in the mouth.

Example 7-3

Margarine (spread) was prepared with the following composition.

| Fats and Oils | 70% by weight |
|---|---|
| Water | Balance |
| Powdered Skim Milk | 20% by weight |
| Lecithin | 0.2% by weight |
| Sorbitan Distearate | 0.3% by weight |
| Flavor, Colorant | Appropriate amounts |

Using fats and oils prepared by adding glycerol monobehenate in an amount of 2% by weight and hexaglycerol octastearate in an amount of 2% by weight to soybean oil in an amount of 50% by weight and milk fat in an amount of 46% by weight, the resulting mixture was emulsified, rapid-cooled and kneaded, to give a margarine which was excellent in appearance and meltability in mouth.

Comparative Example 7-1

The fats and oils of Example 7-1 were replaced with corn oil in an amount of 100% by weight to prepare a margarine in the same manner. However, the margarine did not solidify, and separation of fats and oils was generated, so that those having excellent properties could not be obtained.

Comparative Example 7-2

The fats and oils of Example 7-3 were replaced with those fats and oils prepared by adding together palm oil in an amount of 50% by weight and milk fat in an amount of 50% by weight, to give a margarine in the same manner.

Test Example 7

A butter cream was prepared with the following composition using as raw materials margarine (spread) for butter creams obtained in Example 7-3 and Comparative Example 7-2.

| | |
|---|---|
| Margarine | 100 parts by weight |
| Sugar | 100 parts by weight |
| Thick Malt Syrup | 20 parts by weight |
| Water | 30 parts by weight |
| Flavor, Brandy | Appropriate amounts |

To margarine were gradually added and kneaded other raw materials using a Hobert mixer, to give a butter cream. The evaluation results thereof are shown in Table 13.

Incidentally, the appearance, the meltability in mouth and the shape retention of butter creams were evaluated by 20 selected monitors.

TABLE 13

| | Appearance | Meltability in Mouth | Shape Retention |
|---|---|---|---|
| Example 7-3 | Glossy and no separation being found | Excellent | Excellent |
| Comparative Example 7-2 | Glossy but separation of sugar liquid being found | Slightly rough texture | Excellent |

It is shown from the results in Table 13 that the gutter cream using the fats and oils of Example 7-1 as a raw-material is more excellent in appearance, meltability in mouth and shape retention, as compared with the butter cream using the fats and oils of Comparative Example 7-2 as a raw material.

Example 8 (Chocolate)

Example 8-1

Chocolate was prepared with the following composition.

| | |
|---|---|
| Sugar | 50 parts by weight |
| Cacao Mass | 36 parts by weight |
| Fats and Oils | 14 parts by weight |

-continued

| | |
|---|---|
| Lecithin | 0.1 parts by weight |
| Flavor | 0.1 parts by weight |

Using fats and oils prepared by adding sorbitan monoarachate in an amount of 7% by weight to rapeseed oil in an amount of 93% by weight, the resulting mixture was finely powdered, subjected to conching, tempering and set, to give a chocolate. There was obtained chocolate excellent in the meltability in the mouth and the gloss.

Example 8-2

The fats and oils of Example 8-1 were replaced with fats and oils prepared by adding glycerol monobehenate in an amount of 3% by weight to cacao butter in an amount of 97% by weight, to give a chocolate in the same manner. There was obtained chocolate excellent in the meltability in the mouth and the gloss.

Example 8-3

Non-tempered coating chocolate was prepared with the following composition.

| | |
|---|---|
| Cacao Mass | 10 parts by weight |
| Cocoa Powders | 10 parts by weight |
| Sugar | 46 parts by weight |
| Powdered Skim Milk | 4 parts by weight |
| Fats and Oils | 30 parts by weight |

Using fats and oils prepared by adding glycerol monobehenate in an amount of 3% by weight and hexaglycerol octastearate (HLB=1.5) in an amount of 3% by weight to soybean oil in an amount of 94% by weight, the resulting mixture was finely powdered and subjected to conching, to give a coating chocolate. Further, the coating chocolate was applied on cookies at 45° C. and cooled to 10° C. The appearance was found to be free from cracks and excellent in the gloss, showing favorable applicability for coating.

Comparative Example 8-1

The fats and oils of Example 8-1 were replaced with rapeseed oil to which the setting agent of fats and oils of the present invention is not added, to be prepared in the same manner. There was obtained soft chocolate without gloss.

Comparative Example 8-2

The fats and oils of Example 8-1 were replaced with cacao butter to which the setting agent of fats and oils of the present invention is not added, to be prepared in the same manner. There was obtained chocolate excellent in the meltability in the mouth and the gloss.

Test Example 8

The evaluation results of the chocolates obtained in Examples 8-1 and 8-2 and Comparative Example 8-2 on the palatability and the shape retention (appearance and melting state) are shown in Table 14.

Incidentally, the palatability and the shape retention were evaluated by 20 selected monitors. In addition, the shape retention was evaluated by the visual observation of the appearance (degree of changes in shapes) and the melting state when keeping the chocolate in a thermostatic chamber adjusted to 35° C. for 3 hours.

TABLE 14

| | Palatability | Shape Retention Appearance | Melting |
|---|---|---|---|
| Example 8-1 | Smooth and excellent | Slightly distorted | None |
| Example 8-2 | Smooth and excellent | Excellent | None |
| Comparative Example 8-2 | Poor meltability in mouth, rough texture | Slightly distorted | Melted at small amounts |

It is shown from the results in Table 14 that the chocolates of Examples 8-1 and 8-2 are more excellent in the palatability and the shape retention, as compared with the chocolate of Comparative Example 8-2.

Further, the evaluation results of the chocolates obtained in Example 8-2 and Comparative Example 8-2 on the preservation stability (changes of appearance with the passage of time when stored at 30° C., and heat resistance when allowing the chocolate to stand at 37° C. for one hour) are shown in Table 15. The preservation stability was evaluated by visual observation of 20 selected monitors on changes of appearance with the passage of time when stored at 30° C., and heat resistance when allowing the chocolate to stand at 37° C. for one hour. Incidentally, the criteria for the appearance during preservation are as follows.

⊚: excellent;

◯: gloss is lost; and x: white spots appear.

TABLE 15

| | Appearance During Preservation (30° C.) | | | | Heat Resistance (37° C., 1 hr) |
|---|---|---|---|---|---|
| | At Start | After 1 Mon. | After 3 Mons. | After 6 Mons. | |
| Example 8-2 | ⊚ | ⊚ | ⊚ | ⊚ | Corners remaining, favorable state good heat resistance |
| Comparative Example 8-2 | ⊚ | ◯ | X | X | Corners rounded off, height being lowered, poor heat resistance |

It is shown from the results in Table 15 that the chocolate of Example 8-2 is more excellent in the preservation stability, as compared with the chocolate of Comparative Example 8-2.

Example 9 (Processed Meat Food or Processed Fish Meat Food)

Example 9-1

| Sausage was prepared with the following composition. | |
|---|---|
| Pork Thigh Meat | 63 parts by weight |
| Fats and Oils | 7 parts by weight |
| Ice Water | 22 parts by weight |
| Salt | 2 parts by weight |
| Sugar | 1 part by weight |
| Seasonings | 1 part by weight |
| Nitrite | 0.03 parts by weight |
| Phosphate | 0.3 parts by weight |
| Soybean Protein | 1 part by weight |
| Egg Albumin Powder | 2 parts by weight |
| Sodium Caseinate | 1 part by weight |

Using fats and oils prepared by adding glycerol monobehenate in an amount of 5% by weight to rapeseed oil in an amount of 95% by weight as raw materials, the meat was chopped by a conventional method, and the remaining raw materials were mixed and degassed. Thereafter, the mixture was cured at 5° C. for 24 hours. The cured raw materials were packed in a casing having an inner diameter of 4 cm, kept at 70° C. for 30 minutes, and cooled to 5° C., whereby obtaining a sausage.

Example 9-2

The fats and oils of Example 9-1 were replaced with fats and oils prepared by adding glycerol monobehenate in an amount of 5% by weight and triglycerol pentastearate (HLB=1) in an amount of 3% by weight to soybean oil in an amount of 92% by weight, to give a sausage in the same manner.

Example 9-3

The fats and oils of Example 9-1 were replaced with fats and oils prepared by adding sorbitan monoarachate in an amount of 2% by weight and sucrose stearate (HLB=3) in an amount of 2% by weight to rapeseed oil in an amount of 50% by weight and lard oil in an amount of 40% by weight, to give a sausage in the same manner.

Example 9-4

"Kamoboko" was prepared with the following composition.

| | |
|---|---|
| Walleye Pollack | 100 parts by weight |
| Sorbitol | 4 parts by weight |
| Sugar | 4 parts by weight |
| Seasonings | 7 parts by weight |
| Salt | 3 parts by weight |
| Sodium Caseinate | 3 parts by weight |
| Fats and Oils | 5 parts by weight |
| Water | 50 parts by weight |

Using fats and oils prepared by adding glycerol monobehenate in an amount of 2% by weight and hexaglycerol octastearate (HLB=1.5) in an amount of 2% by weight to corn oil in an amount of 96% by weight, the walleye pollack, sorbitol and sugar were mixed to prepare "surimi". The remaining raw materials were mixed with a silent cutter, and sufficiently stirred until the mixture became homogeneous. Thereafter, the resulting mixture was packed in a casing with a height of 45 mm, kept at 90° C. for 30 minutes, and then cooled to 10° C., to give a "kamaboko."

Comparative Example 9-1

The fats and oils of Example 9-1 were replaced with rapeseed oil in an amount of 100% by weight to give a sausage in the same manner.

Comparative Example 9-2

The fats and oils of Example 9-1 were replaced with lard in an amount of 100% by weight to give a sausage in the same manner.

Comparative Example 9-3

The fats and oils of Example 9-4 were replaced with corn oil in an amount of 100% by weight to give a "kamaboko" in the same manner.

Test Example 9-1

The evaluation results of the sausages obtained in Examples 9-1, 9-2 and 9-3 and Comparative Example 9-1 and 9-2 are shown in Table 16.

Incidentally, the appearance and the palatability were evaluated by 20 selected monitors, and the hardness was measured with a rheometer.

TABLE 16

|  | Appearance and Palatability | Hardness (g/cm$^2$) |
| --- | --- | --- |
| Example 9-1 | Excellent palatability without separation of oily ingredients | 845 |
| Example 9-2 | Excellent palatability without separation of oily ingredients | 905 |
| Example 9-3 | Excellent palatability without separation of oily ingredients | 980 |
| Comparative Example 9-1 | Soft, generation of large amounts of separation of oily ingredients | 415 |
| Comparative Example 9-2 | Slightly loose, lumpy oil, not homogeneously dispersed | 700 |

It is shown from the results in Table 16 that the sausages of Examples 9-1, 9-2 and 9-3 are more excellent in the appearance and the palatability, as compared with the sausages of Comparative Examples 9-1 and 9-2.

Test Example 9-2

The evaluation results of the "kamoboko"s obtained in Example 9-4 and Comparative Example 9-3 are shown in Table 17.

Incidentally, the appearance and the palatability were evaluated by 20 selected monitors, and the hardness was measured with a rheometer.

TABLE 17

|  | Appearance and Palatability | Hardness (g/cm$^2$) |
| --- | --- | --- |
| Example 9-4 | Excellent palatability without separation of oily ingredients | 395 |
| Comparative Example 9-3 | Very soft, generation of large amounts of separation of oily ingredients | 160 |

It is shown from the results in Table 17 that the "kamaboko" of Example 9-4 is more excellent in the appearance and the palatability, as compared with the "kamaboko of Comparative Example 9-3.

INDUSTRIAL APPLICABILITY

The fats and oils having desired physical properties can be prepared by using the setting agent of fats and oils of the present invention without carrying hydrogenation, ester-exchanging, separation, and the like of fats and oils. In addition, there can be exhibited excellent effects that the changes in the fatty acid composition in the raw materials for fats and oils are suppressed, and a desired setting strength can be obtained with a small amount of use. In addition, when the setting agent of fats and oils of the present invention is used for edible raw materials for fats and oils, there is exhibited an excellent effect that a decrease in the nutritional value inherently owned by the fats and oils is suppressed without formation of trans-fatty acids which give an adverse effect on the human body. By using the fats and oils prepared by adding the setting agent of fats and oils of the present invention, foods having desired palatabilities, appearances, preservation ability, and the like can be prepared. Further, the food comprising the fats and oils of the present invention has excellent palatabilities, appearances, preservation ability, and the like, since the fats and oils contain the setting agent for fats and oils.

What is claimed is:

1. A setting agent for fats or oils which comprises:
   (A) an ester of a fatty acid having 20 or more carbon atoms, and
   (B) at least one compound selected from the group consisting of polyglycerol fatty acid esters of which HLB is 3 or less and sucrose fatty acid esters of which HLB is 3 or less,
   wherein the ester of a fatty acid having 20 or more carbon atoms is an ester compound derived from at least one compound selected from the group consisting of arachic acid and behenic acid, and at least one compound selected from the group consisting of propylene glycol, sorbitan, pentaerythritol and diglycerol.

2. The setting agent for fats or oils according to claim 1, wherein the ester of a fatty acid having 20 or more carbon atoms is present at from 10 to 90% by weight.

3. Fats or oils prepared by adding the setting agent for fats or oils according to claim 1 to raw materials for fats or oils.

4. The fats or oils according to claim 3, wherein the amount of the setting agent for fats or oils is from 0.1 to 20% by weight as an amount of the ester of a fatty acid having 20 or more carbon atoms, or as a total amount of the amount of the ester of a fatty acid having 20 or more carbon atoms and the amount of at least one compound selected from the group consisting of polyglycerol fatty acid esters of which HLB is 3 or less and sucrose fatty acid esters of which HLB is 3 or less.

5. The fats or oils according to claim 3, wherein the fats or oils are selected from the group consisting of shortening, frying oil, and powdered fats and oils.

6. Food comprising the fats or oils according to claim 3.

7. The food according to claim 6, wherein the food is at least one kind selected from the group consisting of powdered fats or oils, cream, cold confectionery, margarine, chocolates, processed meat and processed fish meat.

8. The fats or oils according to claim 3, wherein the ester of a fatty acid having 20 or more carbon atoms is selected from the group consisting diglycerol monobehenate, propylene glycol monobehenate, sorbitan monoarachate, and sorbitan diarachinate.

9. The setting agent for fats or oils according to claim 1, wherein the ester of a fatty acid having 20 or more carbon atoms is selected from the group consisting of diglycerol monobehenate, propylene glycol monobehenate, sorbitan monoarachate, and sorbitan diarachinate.

10. The setting agent for fats or oils according to claim 1, wherein the polyglycerol fatty acid ester of which HLB is 3 or less is selected from the group consisting of diglycerol monostearate, triglycerol tetrapalmitate, triglycerol pentastearate, hexaglycerol pentastearate, hexaglycerol octastearate, and decaglycerol decapalmitate.

11. The setting agent for fats or oils according to claim 1, wherein the sucrose fatty acid ester of which HLB is 3 or less is selected from the group consisting of sucrose esters of palmitic acid, and stearic acid.

12. A method for setting fats or oils comprising adding a setting agent to either the fat or oil or a food raw material containing the fat or oil, wherein the setting agent comprises:
(A) an ester of a fatty acid having 20 or more carbon atoms, and
(B) at least one compound selected from the group consisting of polyglycerol fatty acid esters of which HLB is 3 or less and sucrose fatty acid esters of which HLB is 3 or less,
wherein the ester of a fatty acid having 20 or more carbon atoms is an ester compound derived from at least one compound selected from the group consisting of arachic acid and behenic acid, and at least one compound selected from the group consisting of propylene glycol, glycerol, sorbitan, pentaerythritol and diglycerol.

13. Fats or oils prepared according to the method of claim 12.

14. A food product comprising the fats or oils according to claim 13.

15. The method for setting fats or oils according to claim 12, wherein the ester of a fatty acid having 20 or more carbon atoms is selected from the group consisting of glycerol monobehenate, diglycerol monobehenate, propylene glycol monobehenate, sorbitan monoarachate, and sorbitan diarachinate.

16. The method for setting fats or oils according to claim 12, wherein the polyglycerol fatty acid ester of which HLB is 3 or less is selected from the group consisting of diglycerol monostearate, triglycerol tetrapalmitate, triglycerol pentastearate, hexaglycerol pentastearate, hexaglycerol octastearate, and decaglycerol decapalmitate.

17. The method for setting fats or oils according to claim 12, wherein the sucrose fatty acid ester of which HLB is 3 or less is selected from the group consisting of sucrose esters of palmitic acid, and stearic acid.

18. A setting agent for fats or oils which comprises:
(A) an ester of a fatty acid having 20 or more carbon atoms, and
(B) at least one polyglycerol fatty acid ester of which HLB is 3 or less,
wherein the ester of a fatty acid having 20 or more carbon atoms is an ester compound derived from at least one compound selected from the group consisting of arachic acid and behenic acid, and glycerol.

* * * * *